(12) United States Patent
Myoren et al.

(10) Patent No.: US 10,323,570 B2
(45) Date of Patent: Jun. 18, 2019

(54) TWO-SHAFT GAS TURBINE, AND CONTROL SYSTEM AND CONTROL METHOD OF THE GAS TURBINE

(71) Applicant: Mitsubishi Hitachi Power Systems, Ltd., Nishi-ku, Yokohama (JP)

(72) Inventors: Chihiro Myoren, Yokohama (JP); Kenji Nanataki, Yokohama (JP); Yasuo Takahashi, Yokohama (JP); Kota Kawamura, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 524 days.

(21) Appl. No.: 15/049,618

(22) Filed: Feb. 22, 2016

(65) Prior Publication Data
US 2016/0245172 A1 Aug. 25, 2016

(30) Foreign Application Priority Data

Feb. 23, 2015 (JP) ................................. 2015-032744

(51) Int. Cl.
*F02C 9/28* (2006.01)
*F02C 9/20* (2006.01)
(Continued)

(52) U.S. Cl.
CPC .................. *F02C 3/10* (2013.01); *F02C 9/20* (2013.01); *F02C 9/22* (2013.01); *F02C 9/28* (2013.01); *F02C 9/54* (2013.01); *F05D 2220/32* (2013.01)

(58) Field of Classification Search
CPC ...... F02C 3/10; F02C 9/20; F02C 9/22; F02C 9/28; F02C 9/54
See application file for complete search history.

(56) References Cited

U.S. PATENT DOCUMENTS 3,168,810 A * 2/1965 Gratzemeyer ............ F02C 3/10
60/39.25
3,749,048 A * 7/1973 Jones ..................... B63H 21/22
416/30
(Continued)

FOREIGN PATENT DOCUMENTS

EP 0 279 487 A2 8/1988
EP 1 548 236 A2 6/2005
(Continued)

OTHER PUBLICATIONS

Extended European Search Report issued in counterpart European Application No. 16156427.3 dated Jul. 19, 2016 (Five (5) pages).
(Continued)

*Primary Examiner* — Todd E Manahan
*Assistant Examiner* — Eric W Linderman
(74) *Attorney, Agent, or Firm* — Crowell & Moring LLP

(57) ABSTRACT

A two-shaft gas turbine of the present invention, in which a mass flow of an air into a compressor is regulated by controlling a set angle of an inlet guide vane (IGV) on an air intake side of the compressor, comprises, as a device to control the set angle of the IGV, a first controller to control the set angle of the IGV based on a corrected speed of the gas generator shaft during low speed rotation of the gas generator shaft, the corrected speed having been corrected according to an ambient temperature; a second controller to control the set angle of the IGV to maintain a constant actual speed of the gas generator shaft during high speed rotation of the gas generator shaft; and an ambient temperature correction part to increase the actual speed maintained constant by the second controller if the ambient temperature is equal to or more than a threshold value.

16 Claims, 9 Drawing Sheets

(51) Int. Cl.
  *F02C 3/10* (2006.01)
  *F02C 9/54* (2006.01)
  *F02C 9/22* (2006.01)

(56) References Cited

U.S. PATENT DOCUMENTS

| | | | | |
|---|---|---|---|---|
| 3,771,916 A * | 11/1973 | Flanigan | F02C 3/10 | 180/301 |
| 3,956,887 A * | 5/1976 | MacDonald | F02C 3/06 | 415/181 |
| 3,973,391 A * | 8/1976 | Reed | F01K 23/105 | 290/40 C |
| 4,037,990 A * | 7/1977 | Harris | F01D 5/3053 | 416/135 |
| 4,157,010 A * | 6/1979 | Sailer | F02C 3/10 | 60/39.17 |
| 4,159,625 A * | 7/1979 | Kerr | F02K 1/17 | 60/204 |
| 4,299,088 A * | 11/1981 | Rowen | F02C 9/54 | 60/39.27 |
| 4,428,194 A * | 1/1984 | Stokes | F02C 9/18 | 415/27 |
| 4,539,810 A * | 9/1985 | Watanabe | F02C 3/10 | 60/39.25 |
| 4,550,565 A * | 11/1985 | Ozono | F01K 23/101 | 60/39.182 |
| 4,809,497 A * | 3/1989 | Schuh | F02C 3/085 | 417/280 |
| 4,864,816 A * | 9/1989 | Benvenuti | F01D 17/06 | 60/792 |
| 4,907,944 A * | 3/1990 | Kroger | F01D 5/3038 | 415/190 |
| 5,141,401 A * | 8/1992 | Juenger | F01D 5/3007 | 416/219 R |
| 5,197,857 A * | 3/1993 | Glynn | F01D 5/02 | 416/204 A |
| 5,636,507 A * | 6/1997 | Rajamani | F02C 9/28 | 60/39.27 |
| 5,775,092 A * | 7/1998 | Hines | F02K 3/075 | 60/726 |
| 5,794,431 A * | 8/1998 | Utamura | F01K 23/101 | 60/39.182 |
| 5,857,321 A * | 1/1999 | Rajamani | F02C 9/22 | 60/39.24 |
| 5,896,736 A * | 4/1999 | Rajamani | F02C 9/20 | 60/773 |
| 6,164,057 A * | 12/2000 | Rowen | F02C 9/54 | 60/39.27 |
| 6,226,974 B1 * | 5/2001 | Andrew | F02C 9/28 | 60/772 |
| 6,364,602 B1 * | 4/2002 | Andrew | F01D 21/10 | 415/1 |
| 6,735,955 B2 * | 5/2004 | Mannarino | F04D 27/0246 | 60/794 |
| 6,935,119 B2 * | 8/2005 | Placko | F02C 3/305 | 60/39.3 |
| 8,196,414 B2 | 6/2012 | Nanataki et al. | | |
| 9,951,696 B2 * | 4/2018 | Nanataki | F02C 9/00 | |
| 2004/0011051 A1 * | 1/2004 | Ryan | F02C 9/28 | 60/773 |
| 2004/0037697 A1 * | 2/2004 | Sanborn | F02C 9/00 | 415/118 |
| 2004/0055273 A1 * | 3/2004 | Hirayama | F02C 9/28 | 60/39.281 |
| 2005/0107941 A1 * | 5/2005 | Healy | F02C 9/28 | 701/100 |
| 2005/0109033 A1 * | 5/2005 | Braun | F02C 7/141 | 60/772 |
| 2005/0131616 A1 * | 6/2005 | Fujii | F01D 15/10 | 701/100 |
| 2007/0031238 A1 * | 2/2007 | Fujii | F02C 9/20 | 415/48 |
| 2007/0041841 A1 * | 2/2007 | Walter | F01D 5/141 | 416/223 R |
| 2007/0139193 A1 * | 6/2007 | Arik | F01D 17/02 | 340/539.26 |
| 2008/0243352 A1 * | 10/2008 | Healy | F01D 17/00 | 701/100 |
| 2009/0000267 A1 * | 1/2009 | Law | F02C 9/20 | 60/39.182 |
| 2009/0071165 A1 * | 3/2009 | Matz | F01D 5/10 | 60/772 |
| 2009/0193788 A1 * | 8/2009 | Szepek | H04B 17/345 | 60/39.281 |
| 2010/0005808 A1 * | 1/2010 | Nanataki | F02C 9/20 | 60/773 |
| 2010/0068049 A1 * | 3/2010 | Thermos | F01D 17/162 | 415/209.3 |
| 2010/0180604 A1 * | 7/2010 | Kawai | F23N 5/184 | 60/778 |
| 2010/0198419 A1 * | 8/2010 | Sonoda | F01D 17/16 | 700/290 |
| 2011/0037276 A1 * | 2/2011 | Hoffmann | F02C 9/22 | 290/40 C |
| 2011/0056180 A1 * | 3/2011 | Nomura | F02C 9/18 | 60/39.24 |
| 2011/0185698 A1 * | 8/2011 | Morgan | F02C 9/00 | 60/39.24 |
| 2012/0017600 A1 * | 1/2012 | Saito | F02C 9/263 | 60/773 |
| 2012/0036861 A1 * | 2/2012 | Seely | F02C 9/28 | 60/776 |
| 2012/0051927 A1 * | 3/2012 | LaMaster | F01D 5/141 | 416/223 A |
| 2012/0070267 A1 * | 3/2012 | Takahashi | F01D 5/142 | 415/1 |
| 2012/0163965 A1 * | 6/2012 | Takahashi | F04D 29/544 | 415/199.4 |
| 2012/0167581 A1 * | 7/2012 | Pesce | F01K 23/101 | 60/773 |
| 2012/0230834 A1 * | 9/2012 | Cornelius | F01D 5/141 | 416/243 |
| 2012/0259528 A1 * | 10/2012 | Minto | F01D 17/16 | 701/100 |
| 2013/0118146 A1 * | 5/2013 | Nanataki | F02C 9/00 | 60/39.182 |
| 2013/0336777 A1 * | 12/2013 | McKeever | F04D 29/542 | 415/208.1 |
| 2014/0000272 A1 * | 1/2014 | Fichtner | F02C 9/20 | 60/773 |
| 2014/0033720 A1 * | 2/2014 | Kim | F02C 3/30 | 60/726 |
| 2014/0053567 A1 * | 2/2014 | Langenbacher | F01D 15/10 | 60/773 |
| 2014/0090353 A1 * | 4/2014 | Simons | F02C 9/00 | 60/39.5 |
| 2014/0156165 A1 * | 6/2014 | Ewens | F02C 9/28 | 701/100 |
| 2014/0165592 A1 * | 6/2014 | Key | F01D 5/141 | 60/805 |
| 2014/0325990 A1 * | 11/2014 | Takeda | F02C 9/20 | 60/775 |
| 2014/0352320 A1 * | 12/2014 | Nanataki | F02C 3/10 | 60/774 |
| 2015/0027131 A1 | 1/2015 | Takeda et al. | | |
| 2015/0135722 A1 * | 5/2015 | Takahashi | F02C 3/107 | 60/774 |
| 2015/0171705 A1 * | 6/2015 | Hino | F01D 15/10 | 290/1 A |
| 2016/0252015 A1 * | 9/2016 | Kusumi | F03D 9/00 | 290/40 B |
| 2016/0356171 A1 * | 12/2016 | Thet | F01D 15/10 | |
| 2017/0096936 A1 * | 4/2017 | Nilsson | F02C 3/10 | |
| 2017/0138272 A1 * | 5/2017 | Kusumi | F02C 7/057 | |
| 2017/0145924 A1 * | 5/2017 | Zhang | G01M 15/14 | |
| 2017/0159562 A1 * | 6/2017 | Takahashi | F02C 3/10 | |

(56) References Cited

U.S. PATENT DOCUMENTS

2017/0254282 A1*  9/2017  Sonoda ................ F02D 41/024
2017/0284308 A1* 10/2017  Myoren .................... F02C 3/10

FOREIGN PATENT DOCUMENTS

| EP | 2 143 908 A2 | 1/2010 |
| JP | 2010-19165 A | 1/2010 |
| JP | 2011-38531 A | 2/2011 |
| JP | 2015-25428 A | 2/2015 |

OTHER PUBLICATIONS

Japanese-language Office Action issued in counterpart Japanese Application No. 2015-032744 dated May 8, 2018 with English translation (seven (7) pages).

\* cited by examiner

TWO-SHAFT GAS TURBINE, AND CONTROL SYSTEM AND CONTROL METHOD OF THE GAS TURBINE

CLAIM OF PRIORITY

The present application claims priority from Japanese Patent Application JP 2015-032744 filed on Feb. 23, 2015, the content of which is hereby incorporated by reference into this application.

FIELD OF THE INVENTION

The present invention relates to a two-shaft gas turbine and the control system and control method thereof. Particularly, the present invention relates to a two-shaft gas turbine suitable for a type which includes a gas generator including a compressor, a combustor and a high pressure turbine for driving the compressor and a low pressure turbine for driving a load, and to the control system and control method thereof.

BACKGROUND OF THE INVENTION

With an increase in energy demand in recent years, the demand has been increasing for a gas turbine for mechanical drive which is suited for the production of liquid natural gas (LNG). LNG plants accomplish liquefaction by pressurizing the natural gas by means of an LNG liquefying compressor. The two-shaft gas turbine in particular is commonly used for driving the LNG liquefying compressor.

In the two-shaft gas turbine, a turbine part is divided into a low pressure turbine and a high pressure turbine. The low pressure turbine is responsible for driving an LNG compressor or load while the high pressure turbine, as the gas generator, is connected with the compressor. The two-shaft gas turbine has a feature that each of the high pressure turbine and the low pressure turbine has a rotation shaft independent from each other.

The two-shaft gas turbine is used not only for the above-described mechanical drive but may also be used for power generation to be connected to an electric generator. Because of its simple structure and easy operation, a one-shaft gas turbine featuring coaxial rotation of the compressor and the turbine is predominantly used as a gas turbine for power generation. However, in the case of downsizing, the one-shaft gas turbine suffers from the disadvantage of requiring a decelerator because the gas turbine needs to maintain the rotational speed in accordance with the specifications of the electric generator.

On the other hand, the use of the two-shaft gas turbine for power generation negates the need for the decelerator because a rotational speed of the gas generator including the compressor, combustor and high pressure turbine and a rotational speed of the low pressure turbine can be chosen freely. Accordingly, a compact and highly efficient gas turbine can be provided.

In the operation of such a two-shaft gas turbine, the set angle of an inlet guide vane (hereinafter, referred to as IGV) of the compressor is regulated based on a corrected speed of a gas generator shaft, the corrected speed obtained by considering the influence of the ambient temperature on an actual speed of the gas generator shaft. It has been a common practice to provide an IGV control based on the corrected speed regardless of an operating state of the gas generator.

In this case, the IGV set angle varies according to the corrected speed correlated with the ambient temperature as illustrated in FIG. 9A showing a relation between the corrected speed of the gas generator shaft and the IGV set angle. (The relation between the corrected speed of the gas generator shaft and the IGV set angle is uniquely decided.) Therefore, the operation line varies as illustrated in FIG. 9B showing a relation between the actual speed of the gas generator shaft and the IGV set angle. As a result, the rotational speed of the gas generator shaft varies depending upon the ambient temperature. That is, even when the gas turbine is operated in the vicinity of the rated load by increasing the IGV set angle, the actual speed of the gas generator shaft varies depending upon the ambient temperature.

This leads to the increase in a region of blade resonance avoidance during the rated load operation, which makes resonance avoidance design more difficult. Further, the increase in the region of resonance avoidance means a decrease in the freedom of airfoil design. This makes it more difficult to improve the aerodynamic performance of the airfoil.

With an aim to avoid the above-described resonance during the rated load operation, a control method of the two-shaft gas turbine is disclosed in JP 2011-38531. JP 2011-38531 focuses attention on a fact that the importance of avoiding surge (fluid pulsation phenomenon induced by flow separation from compressor blades) by way of the control based on the corrected speed decreases during the high speed rotation including the rated load operation condition. The two-shaft gas turbine including the gas generator and the low pressure turbine adopts an IGV control measure in which the IGV set angle is controlled based on the corrected speed of the gas generator shaft during the low speed rotation thereof and the IGV set angle is controlled to maintain a constant actual speed of the gas generator shaft during the high speed rotation thereof.

As illustrated in FIG. 10A showing a relation between the corrected speed of the gas generator shaft and the IGV set angle and illustrated in FIG. 10B showing a relation between the actual speed of the gas generator shaft and the IGV set angle, the use of the control method of the two-shaft gas turbine disclosed in JP 2011-38531 provides operations that the operation line under a low load is constant regardless of the ambient temperature while the corrected speed of the gas generator shaft under a high load varies depending upon the ambient temperature. On the other hand, the operation line under a low load varies depending upon the ambient temperature while the rotational speed of the gas generator shaft under a high load is constant.

Therefore, the control method can effectively eliminate the resonance problem (the problem that the resonance is induced by the rotation speed of the fast-rotating gas generator shaft approaching a resonant rotation speed, increasing a risk of damaging turbine rotor or compressor rotor). Further, the control method can effectively cope with the compressor surging during the low speed rotation. Thus, the control method decreases burden on design related to the resonance problem and facilitates the above-described resonance avoidance design. Furthermore, an improved aerodynamic performance due to the increased freedom of airfoil design is prospected.

As described above, when the control method of two-shaft gas turbine disclosed in JP 2011-38531 is used, both the surge particularly encountered during the low speed rotation including startup and shut-off and the resonance encountered during the high speed rotation including the rated load operation can be avoided.

However, the surge can possibly occur during the high speed rotation although the importance for avoidance is low. Therefore, depending on the operation condition, the control method of the two-shaft gas turbine disclosed in JP 2011-38531 may fail to keep enough surge margin. Particularly under a high ambient temperature condition (30° C. or more, for example) where the actual speed is constant, a margin for the surge normally decreases and hence, the problem of the surge avoidance is likely to emerge.

In view of the above, the present invention aims to provide a two-shaft gas turbine which includes the gas generator and the low pressure turbine and which can ensure the surge avoidance during the high speed rotation under the high ambient temperature condition as well as the above-described surge avoidance during the low speed rotation and the resonance avoidance during the high speed-rotation, and to provide a control system and control method thereof.

SUMMARY OF THE INVENTION

According to an aspect of the present invention for achieving the above object, a two-shaft gas turbine comprising: a gas generator including a compressor configured to have an inlet guide vane on an air intake side and compress inlet air, a combustor configured to generate a combustion gas by combusting the air compressed by the compressor and a fuel, and a high pressure turbine configured to be driven by the combustion gas generated by the combustor; and a low pressure turbine configured to be driven by a gas discharged from the high pressure turbine, wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and wherein the two-shaft gas turbine further comprises, as a device configured to control the set angle of the inlet guide vane: a first controller configured to control the set angle of the inlet guide vane based on a corrected speed of the shaft of the gas generator during low speed rotation of the shaft of the gas generator, the corrected speed having been corrected according to an ambient temperature; a second controller configured to control the set angle of the inlet guide vane to maintain a constant actual speed of the shaft of the gas generator during high speed rotation of the shaft of the gas generator; and an ambient temperature correction part configured to increase the actual speed maintained constant by the second controller in a case where the ambient temperature is equal to or more than a threshold value.

According to another aspect of the present invention for achieving the above object, a control system of a two-shaft gas turbine, wherein the two-shaft gas turbine comprises: a gas generator including a compressor configured to have an inlet guide vane on an air intake side and compress inlet air, a combustor configured to generate a combustion gas by combusting the air compressed by the compressor and a fuel, and a high pressure turbine configured to be driven by the combustion gas generated by the combustor; and a low pressure turbine configured to be driven by a gas discharged from the high pressure turbine, wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and wherein the control system comprises: a first controller configured to control the set angle of the inlet guide vane based on a corrected speed of the shaft of the gas generator during low speed rotation of the shaft of the gas generator, the corrected speed having been corrected according to an ambient temperature; a second controller configured to control the set angle of the inlet guide vane to maintain a constant actual speed of the shaft of the gas generator during high speed rotation of the shaft of the gas generator; and an ambient temperature correction part configured to increase the actual speed maintained constant by the second controller in a case where the ambient temperature is equal to or more than a threshold value.

According to another aspect of the present invention for achieving the above object, a control method of a two-shaft gas turbine, wherein the two-shaft gas turbine comprises: a gas generator including a compressor configured to have an inlet guide vane on an air intake side and compress inlet air, a combustor configured to generate a combustion gas by combusting the air compressed by the compressor and a fuel, and a high pressure turbine configured to be driven by the combustion gas generated by the combustor; and a low pressure turbine configured to be driven by a gas discharged from the high pressure turbine, wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and wherein in the control method, a first control is executed by a first controller during low speed rotation of the shaft of the gas generator, the first control being to control the set angle of the inlet guide vane based on a corrected speed of the shaft of the gas generator, the corrected speed having been corrected according to an ambient temperature; a second control is executed by a second controller during high speed rotation of the shaft of the gas generator, the second control being to control the set angle of the inlet guide vane to maintain a constant actual speed of the shaft of the gas generator; and the actual speed maintained constant by the second controller is increased by an ambient temperature correction part in a case where the ambient temperature is equal to or more than a threshold value.

According to the present invention, even the two-shaft gas turbine including the gas generator and the low pressure turbine has the effect to ensure the surge avoidance during the high speed rotation under the high ambient temperature condition as well as the surge avoidance during the low speed rotation and the resonance avoidance during the high speed rotation.

DETAILED DESCRIPTION OF THE PREFERRED EMBODIMENTS

Figure 1:
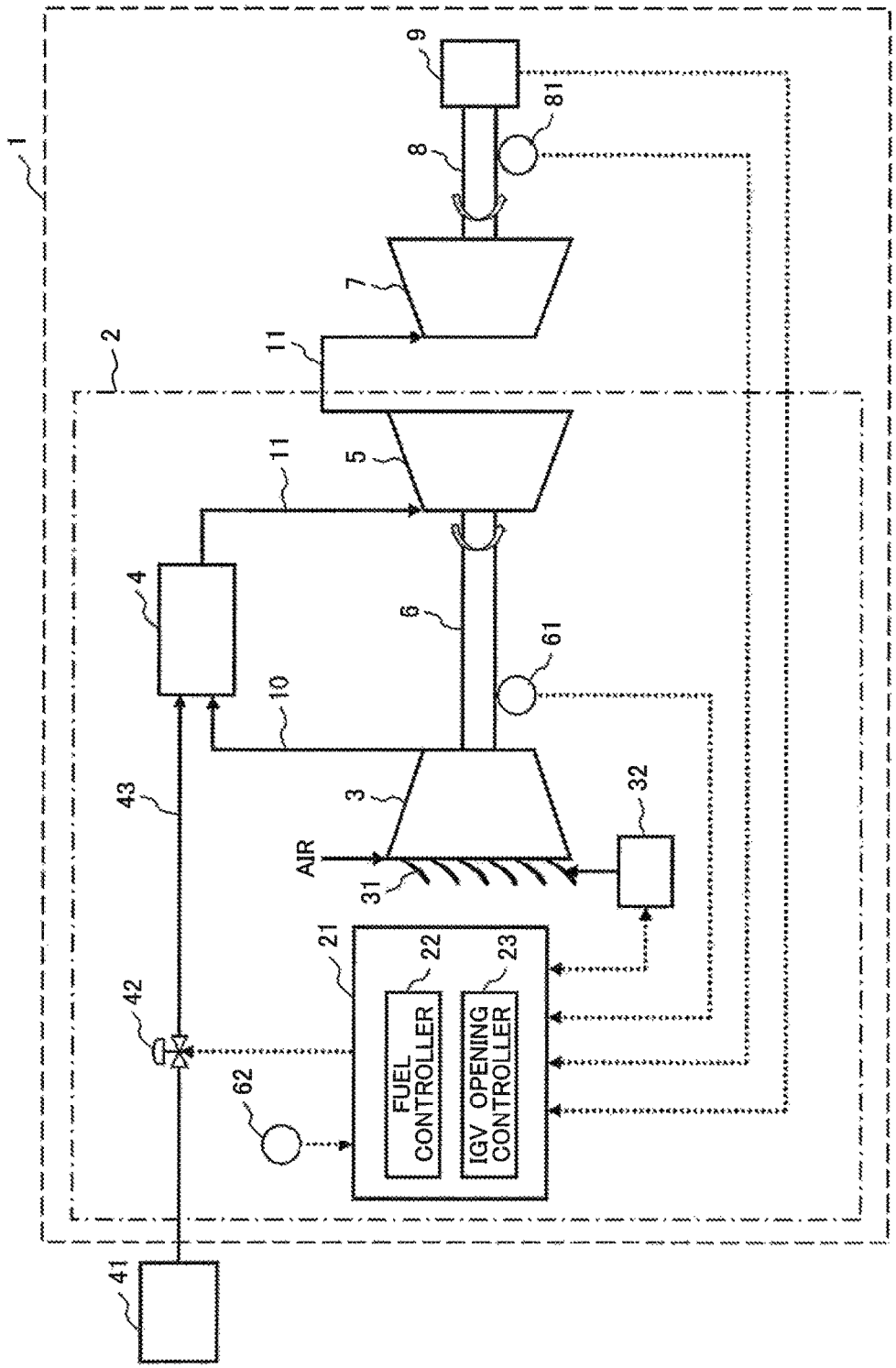
FIG. 1 is a schematic block diagram showing a two-shaft gas turbine according to a first embodiment of the present invention.

A two-shaft gas turbine and the control system and control method thereof according to the present invention will hereinbelow be described with reference to illustrated embodiments thereof. It is noted that identical components of the embodiments will be referred to by the same reference characters.

First Embodiment

FIG. 1 schematically shows a structure of a two-shaft gas turbine according to a first embodiment of the present invention.

As shown in FIG. 1, a two-shaft gas turbine 1 according to this embodiment includes a gas generator 2 including a compressor 3 having an IGV (inlet guide vane) 31 on an air intake side and serving to compress inlet air, a combustor 4 for generating a combustion gas by combusting compressed air 10 compressed by the compressor 3 and a fuel 43, and a high pressure turbine 5 driven by a combustion gas 11 generated by the combustor 4, and a low pressure turbine 7 driven by the combustion gas 11 discharged from the high pressure turbine 5. The two-shaft gas turbine has a gas generator shaft 6 (first shaft) and a low pressure turbine shaft 8 (second shaft) which are separate shafts from each other.

As shown in FIG. 1, the two-shaft gas turbine 1 includes the gas generator 2 including the compressor 3, the combustor 4 and the high pressure turbine 5, and the low pressure turbine 7. In the gas generator 2, the compressor 3 and the high pressure turbine 5 are interconnected via the gas generator shaft 6. In the low pressure turbine 7, the low pressure turbine 7 and a load 9 are interconnected via the low pressure turbine shaft 8.

While this embodiment assumes an electric generator as the load 9, the load 9 may also be an LNG compressor for machine drive.

As described above, the compressor 3 is provided with the IGV 31 on the air intake side thereof. The set angle of the IGV 31 can be varied by an IGV control system 32 whereby the flow rate of intake air (mass airflow) into the gas generator 2 is regulated. The combustor 4 is supplied with the fuel 43 from a fuel supply source 41. The supply of fuel 43 is controlled by a fuel control valve 42.

Working fluids (air, combustion gas, etc.) in the two-shaft gas turbine 1 behave as follows. First, the compressed air 10 compressed in the compressor 3 flows into the combustor 4, where a high temperature combustion gas is generated by injecting the fuel 43. This high temperature and high pressure combustion gas 11 flows into the high pressure turbine 5 which is connected to the compressor 3 via the gas generator shaft 6, to drive the compressor 3. Subsequently, the combustion gas 11 flows into the low pressure turbine 7. When passing through the low pressure turbine 7, the combustion gas 11 drives the load 9 which is connected thereto via the low pressure turbine shaft 8 as the second shaft. Thus electric generation and machine drive are accomplished.

The operating state of the two-shaft gas turbine 1 is principally controlled by a gas generator control system 21 disposed at the gas generator 2. This gas generator control system 21 includes a fuel controller 22 and an IGV set angle controller 23.

The fuel controller 22 controls the fuel control valve 42 by using a rotational speed obtained by a rotational speed detector 81 mounted on the low pressure turbine shaft 8 as the second shaft and operation load data obtained from the load 9, to control the supply of fuel 43 to the combustor 4.

Figure 2:
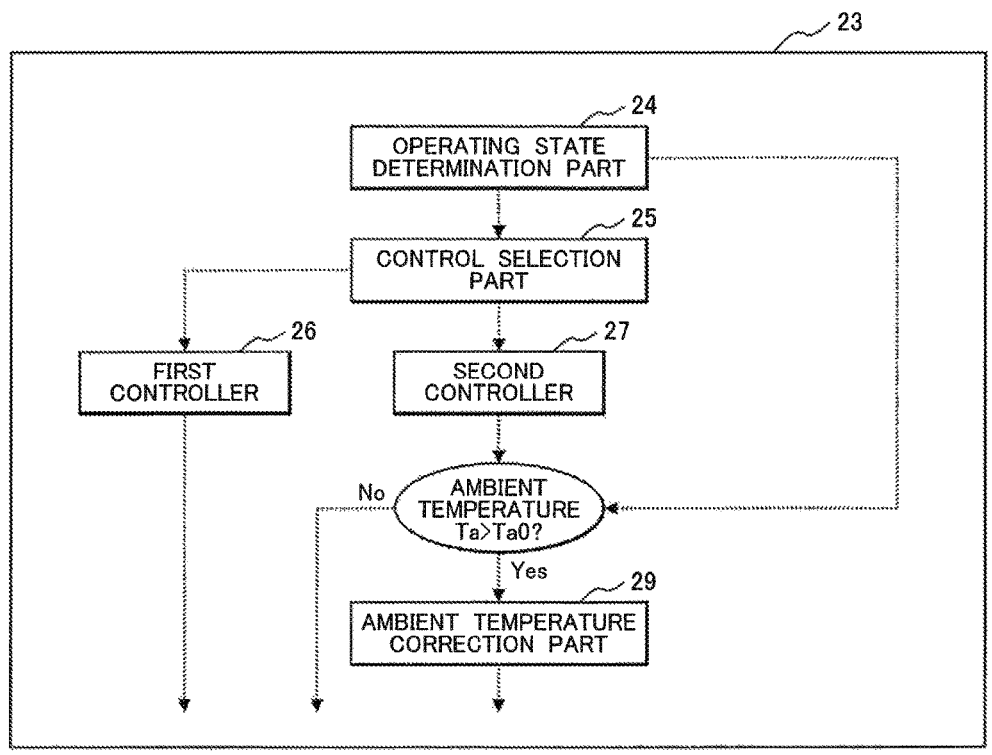
FIG. 2 is a diagram showing an IGV set angle controller of a gas generator control system employed in the two-shaft gas turbine according to the first embodiment of the present invention.

The IGV set angle controller 23 is connected to the IGV control system 32 to control the set angle of the IGV 31, namely the flow rate of intake air into the compressor 3. As shown in FIG. 2, the IGV set angle controller 23 of this embodiment includes an operating state determination part 24, a control selection part 25, a first controller 26, a second controller 27, and an ambient temperature correction part 29.

The first controller 26 controls the set angle of the IGV 31 based on the corrected speed. Specifically, the first controller 26 calculates a corrected speed Nc by using a rotational speed N of the gas generator 2 obtained by a rotational speed detector 61 mounted on the gas generator shaft 6 and an ambient temperature Ta obtained by a thermometer 62. The controller 26 regulates the set angle of the IGV 31 to uniquely set a relation between the corrected speed and the set angle of the IGV 31 regardless of the ambient temperature.

It is noted here that the corrected speed Nc is given by the following equation (1):

$$Nc = N \times [288.15/(273.15+Ta)]^{1/2}. \quad (1)$$

Unlike the first controller 26, the second controller 27 controls the set angle of the IGV 31 in a manner to maintain a constant actual speed of the gas generator 2. While this embodiment assumes a rated rotational speed as the rotational speed to be maintained constant, another rotational speed is also usable as the rotational speed to be maintained constant.

The IGV set angle controller 23 decides which of the first controller 26 and the second controller 27 to use by way of the operating state determination part 24 and the control selection part 25.

The operating state determination part 24 determines whether the operating state of the gas generator 2 is a first operating state including startup, shut-off and a low load operating state or a second operating state including a high load operating state other than the above operating state. The operating state determination part 24 employs a determination method where a target IGV set angle permitting safe operation in spite of the change of control is previously set based on the characteristic of the compressor 3 and distinction between the low load operating state and the high load operating state is made based on the target IGV set angle.

Receiving the determination result from the operating state determination part 24, the control selection part 25 selects one of the first controller 26 and the second controller 27 to use. Specifically, when the gas generator 2 is in the low load operating state as the first operating state, the control selection part 25 selects the first controller 26 to provide a control to uniquely set the corrected speed and the set angle of the IGV 31. When the gas generator 2 is in the high load operating state as the second operating state, the control selection part 25 selects the second controller 27 to provide a control to maintain the actual speed constant.

After completion of the determination of the operating state and the control selection, a control is provided through the ambient temperature correction part 29. Based on the determination result by the operating state determination part 24, the ambient temperature correction part 29 first determines whether the current operating state requires any correction or not. Specifically, the ambient temperature correction part 29 provides a control by sending a signal to the fuel controller 22 such that the rotational speed N of the gas generator 2 is increased to a constant actual speed N' given by multiplying the rotational speed N by a speed correction coefficient α only in a case where the gas generator 2 is in the high load operating state so that the second controller 27 is selected to provide a control and where the ambient temperature Ta is equal to or more than a predetermined threshold value TaO.

Figure 3:
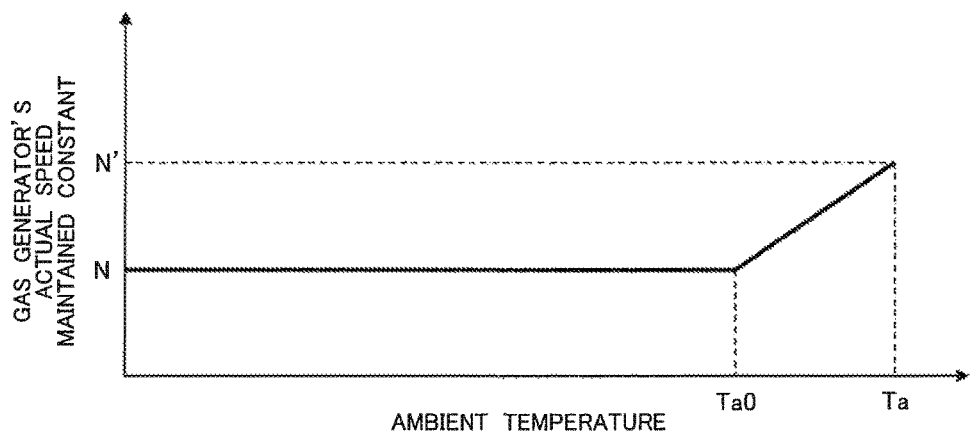
FIG. 3 is a characteristic graph of the two-shaft gas turbine according to the first embodiment of the present invention, showing a relation between the ambient temperature and the actual speed corrected with a speed correction coefficient α.

A relation between the ambient temperature and the speed correction coefficient α according to the embodiment is expressed by an equation (2) and is graphically shown in FIG. 3. Specifically, the actual speed is increased in proportion to the amount of increase from the threshold value TaO of the ambient temperature.

$$\alpha = 1 + \beta(Ta - TaO) \qquad (2)$$

where β denotes a constant.

Figure 4A:
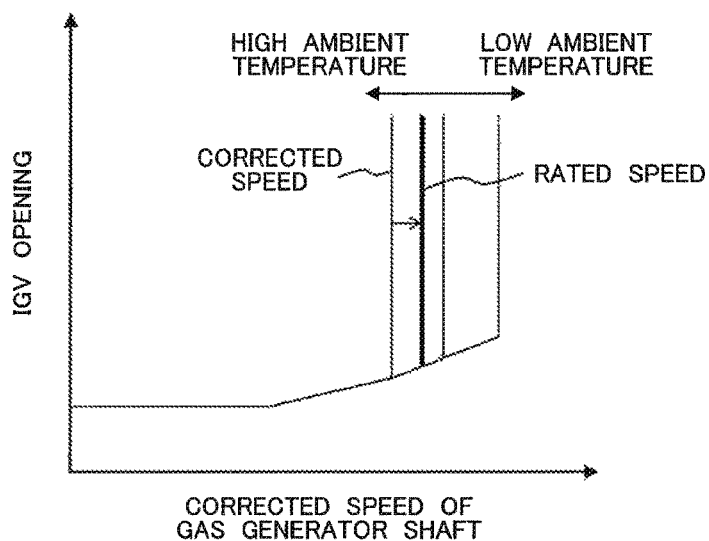
FIG. 4A is a characteristic graph of the two-shaft gas turbine according to the first embodiment of the present invention, showing a relation between the corrected speed of a gas generator shaft and the IGV set angle.
Figure 4B:
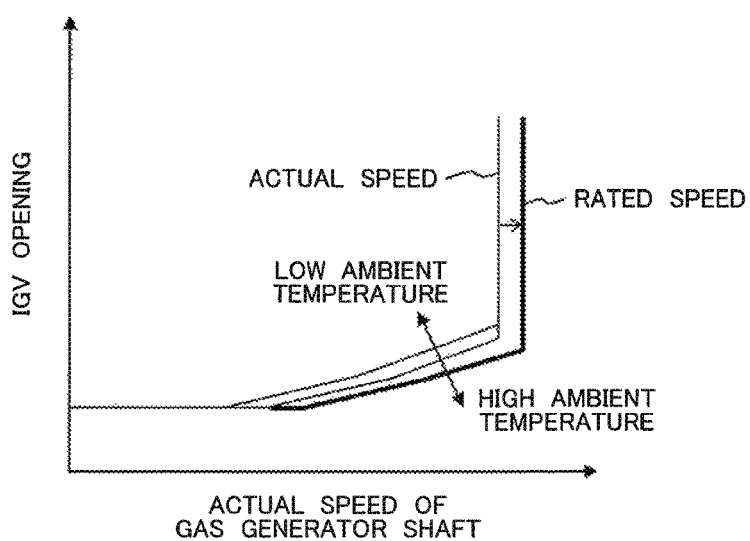
FIG. 4B is a characteristic graph of the two-shaft gas turbine according to the first embodiment of the present invention, showing a relation between the actual speed of the gas generator shaft and the IGV set angle.

The relation between the rotational speed and the IGV set angle in the above-described control is illustrated in FIG. 4A and FIG. 4B.

As shown in FIG. 4A and FIG. 4B, the rotational speed of the gas generator 2 in a high ambient temperature and high load operating state is increased by the ambient temperature correction part 29 so that the corrected speed and the actual speed of the gas generator shaft 6 during the operation are increased to approach the rated speed. Namely, the surge which is feared to occur under the high ambient temperature condition (30° C. or more, for example) is easily avoided during the control provided by the second controller 27 to maintain the actual speed constant.

In comparison to the control suggested by JP 2011-38531, this control further increases the reliability of the compressor 3 in the high ambient temperature and high load operating state and expands the range of operable ambient temperature. Hence, this control also contributes to the improvement of operability of the two-shaft gas turbine 1 per se.

However, if the amount of increase from the rotational speed N of the gas generator 2 to the actual speed N' of the gas generator 2 to be maintained constant is too large, the effect of reducing the resonance avoidance region in the high load operating state as a result of the use of the second controller 27 is lost.

Therefore, this embodiment uses such a speed correction coefficient α as to satisfy the following equation (3). The equation (3) means that the corrected speed calculated based on the operating state after the correction to give the constant actual speed N' of the gas generator 2 is less than the actual speed prior to the correction. That is, the coefficient can at least make the resonance avoidance region smaller than when the control based on the corrected speed is performed in the high load operating state.

$$N'[\times 288.15/(273.15+Ta)]^{1/2} < N. \qquad (3)$$

That is, this embodiment facilitates the avoidance of the surge in the high ambient temperature and high load operating state, which is the issue of concern in JP 2011-38531, while ensuring the effects to avoid the surge in the low load operating state (during low speed rotation) and to decrease the resonance avoidance region in the high load operating state (during high speed rotation), which are stated in JP 2011-38531.

Thus, the reliability of the compressor 3 and the operability of the two-shaft gas turbine 1 can be improved.

According to this embodiment, the ambient temperature correction part increases the rotational speed under the high ambient temperature condition to facilitate the avoidance of the surge during the high speed rotation under the high ambient temperature condition, which may be the problem in JP 2011-38531. Particularly, in a case where a forward stage group exhibits the maximum value in the distribution of blade loadings during the rated load operation of the compressor, as described later, it is difficult to avoid the surge under the high ambient temperature condition. Therefore, the effect of the embodiment becomes noticeable.

Second Embodiment

Figure 5:
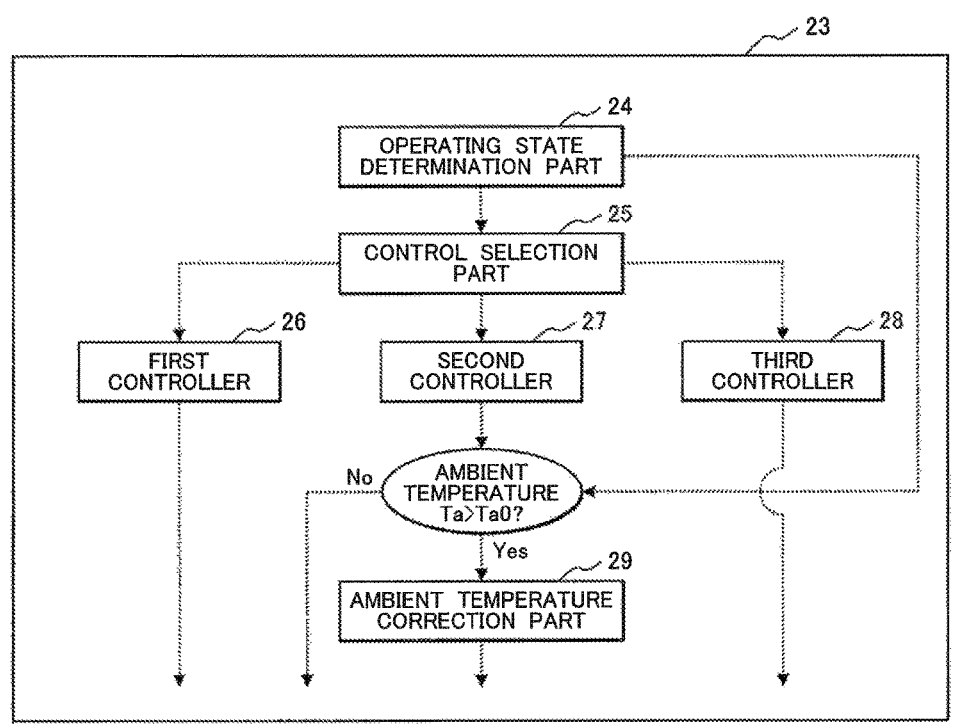
FIG. 5 is a diagram showing an IGV set angle controller of a gas generator control system employed in a two-shaft gas turbine according to a second embodiment of the present invention.

FIG. 5 shows an IGV set angle controller 23 of a gas generator control system 21 employed in a two-shaft gas turbine according to a second embodiment of the present invention.

The embodiment illustrated in FIG. 5 is characterized by the IGV set angle controller 23 having a structure which includes a third controller 28 for maintaining the set angle of the IGV 31 constant regardless of the rotational speed. Except for this, the embodiment is constructed the same way as the first embodiment. Specifically, a control by the third controller 28 is used between the control by the first controller 26 and the control by the second controller 27.

Figure 6A:
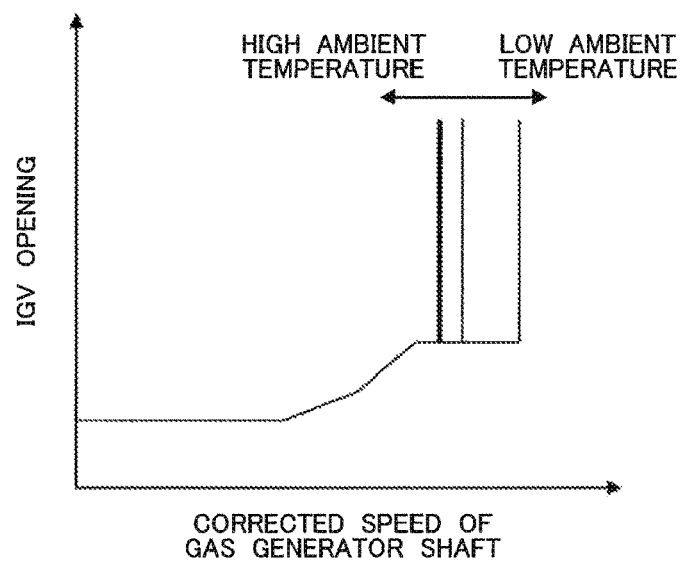
FIG. 6A is a characteristic graph of the two-shaft gas turbine according to the second embodiment of the present invention, showing a relation between the corrected speed of the gas generator shaft and the IGV set angle.
Figure 6B:
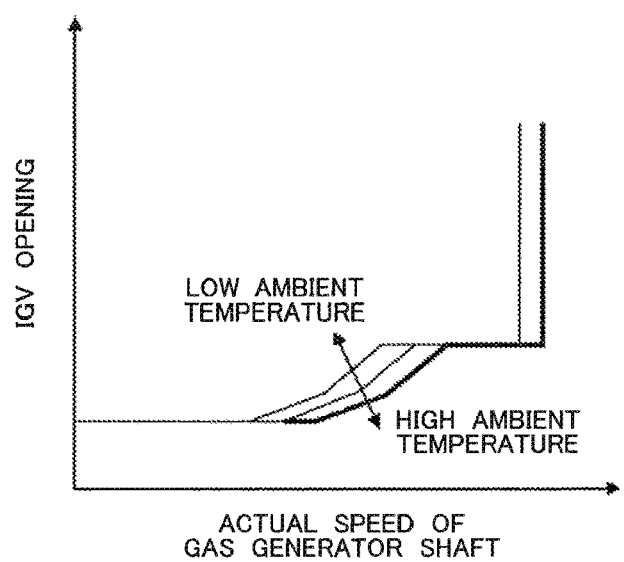
FIG. 6B is a characteristic graph of the two-shaft gas turbine according to the second embodiment of the present invention, showing a relation between the actual speed of the gas generator shaft and the IGV set angle.

As shown in FIG. 6A and FIG. 6B, the control using the third controller 28 as illustrated in this embodiment permits the gas generator 2 to be shifted to an operation under a rated load condition without going through a condition that the set angle of the IGV 31 is small and a great corrected speed and a great actual speed of the gas generator shaft 6. In an operation under conditions that the corrected speed and actual speed of the gas generator shaft 6 are great and the set angle of the IGV 31 is small, only the set angle of the IGV 31 is much less than that of the rated load condition and a deviation of a flow field (deviation of flow angle) from the rated load condition becomes significant. Therefore, the gas turbine is prone to performance degradation. However, the performance degradation can be suppressed by applying the control by the third controller 28. That is, not only the effect to improve the reliability similarly to that of the first embodiment but also an effect to suppress the performance degradation during partial load operation can be achieved by adopting this embodiment.

Third Embodiment

Figure 7:
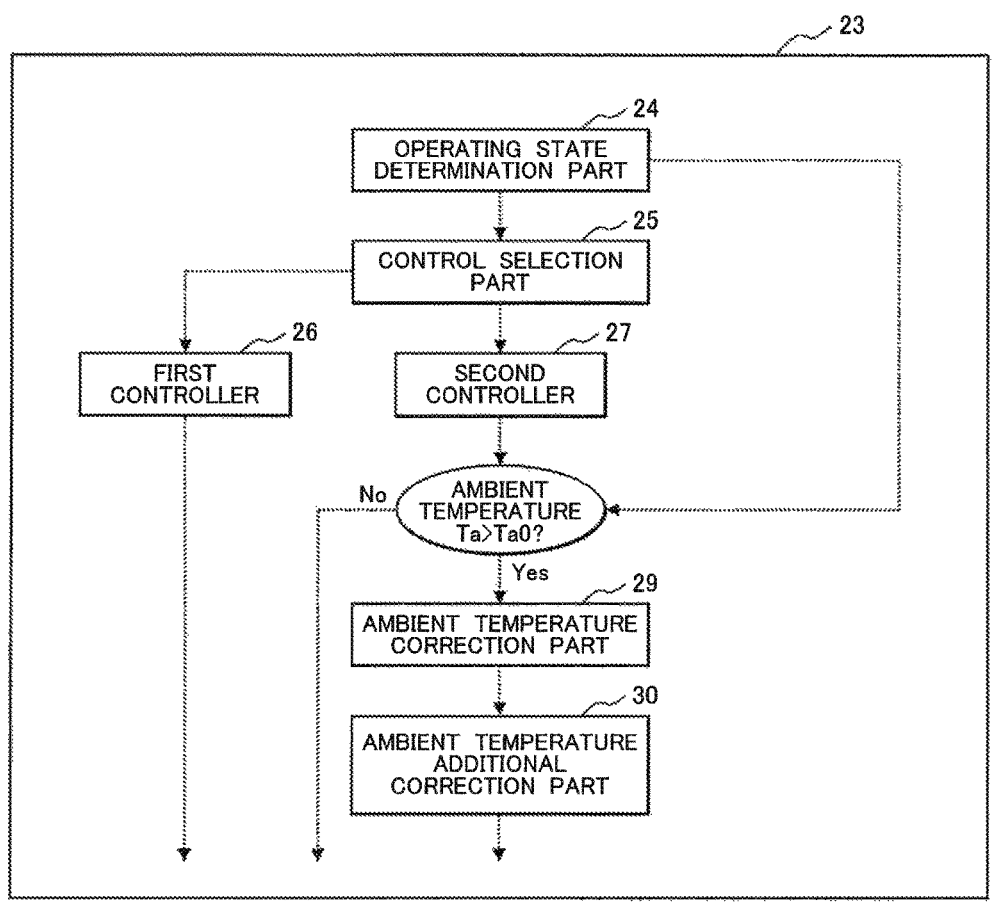
FIG. 7 is a diagram showing an IGV set angle controller of a gas generator control system employed in a two-shaft gas turbine according to a third embodiment of the present invention.

FIG. 7 shows an IGV set angle controller 23 of a gas generator control system 21 employed in a two-shaft gas turbine according to a third embodiment of the present invention.

A difference between the embodiment shown in FIG. 7 and that in FIG. 2 (first embodiment) lies in that the IGV set angle controller 23 further includes, in addition to the ambient temperature correction part 29, an ambient temperature additional correction part 30 for reducing the set angle of the IGV 31. It is noted that the same reference characters refer to the corresponding components in FIG. 2 and the detailed description thereof is omitted.

Figure 8:
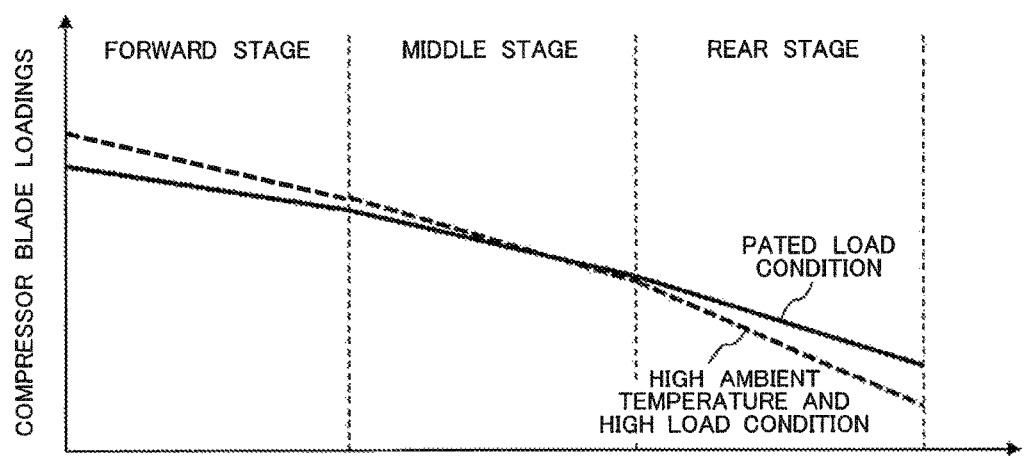
FIG. 8 is a characteristic graph of the two-shaft gas turbine according to the third embodiment of the present invention, showing a relation between the compressor blade stages and the distribution of blade loadings during a rated load operation of a compressor.
Figure 9A:
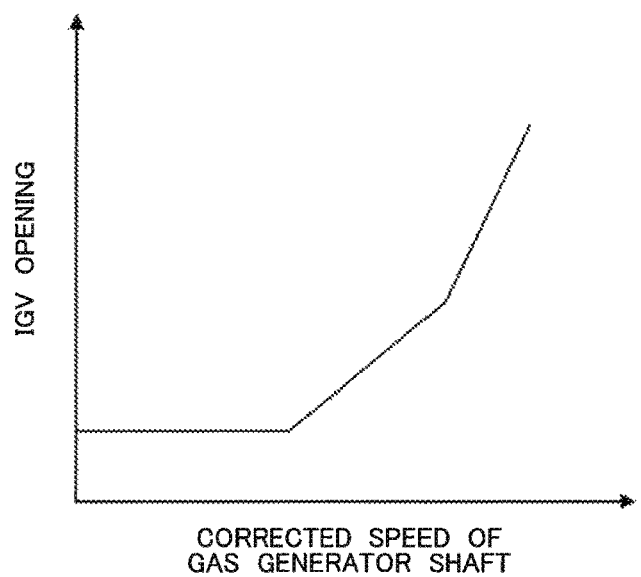
FIG. 9A is a characteristic graph of a common conventional example showing a relation between the corrected speed of the gas generator shaft and the IGV set angle.
Figure 9B:
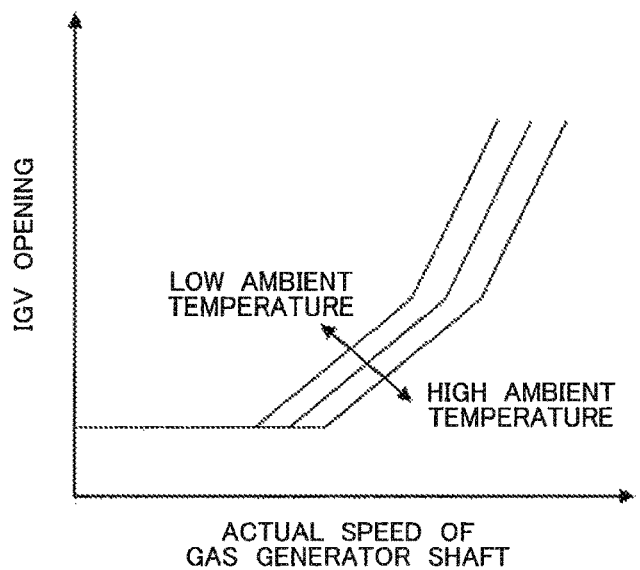
FIG. 9B is a characteristic graph of a common conventional example showing a relation between the actual speed of the gas generator shaft and the IGV set angle.
Figure 10A:
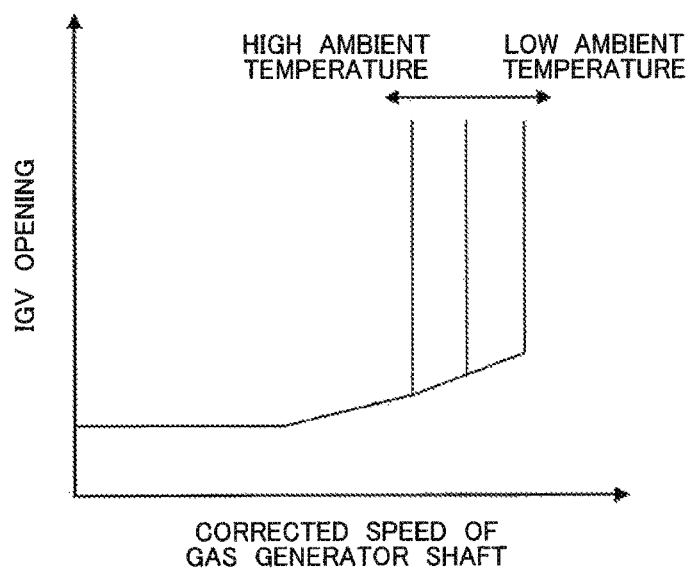
FIG. 10A is a characteristic graph showing a relation between the corrected speed of the gas generator shaft and the IGV set angle in JP 2011-38531.
Figure 10B:
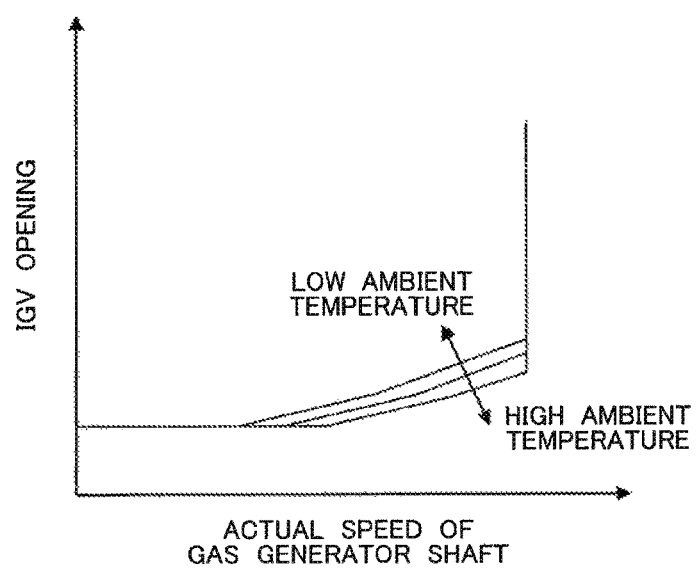
FIG. 10B is a characteristic graph showing a relation between the actual speed of the gas generator shaft and the IGV set angle in JP 2011-38531.

FIG. 8 graphically shows a relation between the stages of compressor blades and the distribution of blade loadings during the rated load operation of the compressor in the embodiment.

As show in FIG. 8, the embodiment assumes that when the compressor 3 is divided into three stage groups of a forward stage group on the most upstream side, a middle stage group positioned in between the other stage groups, and a rear stage group on the most downstream side, each of which has substantially the same number of stages, the forward stage group has the maximum value of the blade loading distribution of the compressor 3. Specifically, such a distribution of blade loadings may be obtained in a case where, for example, a state-of-the-art highly-loaded blade cascade is applied to the forward stage group or the casing of the forward stage group is increased to improve the performance (such as flow rate and pressure ratio) of the existing compressor.

FIG. 8 also shows a distribution of blade loadings of the compressor under the high load and under the high ambient temperature condition. The compressor 3 generally has a tendency that as the ambient temperature rises, the load on the forward stage group increases while the load on the rear stage group decreases. According to the embodiment, in particular, the blade load on the forward stage group is relatively great. Namely, the embodiment provides such a condition that since the blade loading is relatively large in the forward stage group, the blade loading is significantly increased during the rise of the ambient temperature to be prone to suffer the surge. This is because the surge often results from flow separation occurring at a place of high blade loading.

In this embodiment, therefore, the IGV set angle controller 23 is provided with not only the ambient temperature correction part 29 but also the ambient temperature additional correction part 30.

Similarly to the ambient temperature correction part 29, the ambient temperature additional correction part 30 according to this embodiment refers to the result of determination made by the operating state determination part 24 to determine whether or not the correction is required in the current operating state. Specifically, only in a case where the gas turbine is in the high load operating state with the second controller 27 selected as the control and the ambient temperature Ta is equal to or more than the predetermined threshold value TaO, the ambient temperature additional correction part 30 controls the IGV control system 32 by sending a signal to the IGV control system 32 to decrease the set angle of the IGV 31 of the gas generator 2. Namely, the embodiment provides the control not only to increase the rotational speed but also to decrease the IGV set angle under the high ambient temperature condition.

In the case where the set angle of the IGV 31 is decreased, inflow and outflow angles or a velocity triangle deviates from design values (commonly conforming to the rated load condition) at blades around the IGV 31. Hence, the load on the forward stage group relatively decreases while the load on the rear stage group relatively increases. Namely, the control according to the embodiment accomplishes not only the increase of the corrected speed (approximating to the rated speed) as in the first embodiment but also the decrease of the load on the forward stage group due to the decreased set angle of the IGV 31. Therefore, the surge avoidance in this embodiment is easier than in the first embodiment.

That is, similarly to the first embodiment, this embodiment facilitates the avoidance of the surge in the high ambient temperature and high load operating state, which is the issue of concern in JP 2011-38531, while ensuring the effects to avoid the surge in the low load operating state (during low speed rotation) and to decrease the resonance avoidance region in the high load operating state (during high speed rotation), which are stated in JP 2011-38531. Further, this embodiment makes the surge avoidance easier than the first embodiment, thus achieving further improvement of the reliability of the compressor 3 and the operability of the two-shaft gas turbine 1.

All of the above embodiments have been described on assumption that the gas turbine includes the compressor 3 and the compressor 3 is remodeled. As a matter of course, it is also possible to produce a remodeled type of the compressor 3 from the beginning. Further, the control using the third controller 28 described in the second embodiment is also applicable to the two-shaft gas turbines 1 according to any of all the embodiments described above. In this case, as well, the control can avoid the operation in the region of the great rotational speed and the small set angle of the IGV 31 where the gas turbine is prone to the performance degradation. Thus, the control contributes to the improvement in partial load performance.

The invention is not limited to the foregoing embodiments and includes a variety of modifications. The foregoing embodiments are to explain the present invention clearly and are not necessarily limited to what includes all the components described. A part of the structure of one embodiment is replaceable with a structure of another embodiment. It is also possible to add a structure of one embodiment to that of another embodiment. A part of the structure of each embodiment permits addition of another structure, omission thereof or replacement thereof.

EXPLANATION OF REFERENCE CHARACTERS

1: TWO-SHAFT GAS TURBINE
2: GAS GENERATOR
3: COMPRESSOR
4: COMBUSTOR

5: HIGH PRESSURE TURBINE
6: GAS GENERATOR SHAFT
7: LOW PRESSURE TURBINE
8: LOW PRESSURE TURBINE SHAFT
9: LOAD
10: COMPRESSED AIR
11: COMBUSTION GAS
21: GAS GENERATOR CONTROL SYSTEM
22: FUEL CONTROLLER
23: IGV SET ANGLE CONTROLLER
24: OPERATING STATE DETERMINATION PART
25: CONTROL SELECTION PART
26: FIRST CONTROLLER
27: SECOND CONTROLLER
28: THIRD CONTROLLER
29: AMBIENT TEMPERATURE CORRECTION PART
30: AMBIENT TEMPERATURE ADDITIONAL CORRECTION PART
31: INLET GUIDE VANE (IGV)
32: IGV CONTROL SYSTEM
41: FUEL SUPPLY SOURCE
42: FUEL CONTROL VALVE
43: FUEL
61: ROTATIONAL SPEED DETECTOR
62: THERMOMETER
81: ROTATIONAL SPEED DETECTOR

What is claimed is:

1. A two-shaft gas turbine comprising:
a gas generator including a compressor configured to have an inlet guide vane on an air intake side and compress inlet air, a combustor configured to generate a combustion gas by combusting the inlet air compressed by the compressor and a fuel, and a high pressure turbine configured to be driven by the combustion gas generated by the combustor; and
a low pressure turbine configured to be driven by a gas discharged from the high pressure turbine,
wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and
wherein the two-shaft gas turbine further comprises:
a first controller configured to control the set angle of the inlet guide vane based on a corrected speed of the first shaft of the gas generator during low speed rotation of the first shaft of the gas generator, the corrected speed having been corrected according to an ambient temperature;
a second controller configured to control the set angle of the inlet guide vane to maintain a constant actual speed of the first shaft of the gas generator during high speed rotation of the first shaft of the gas generator;
an ambient temperature correction part configured to increase the constant actual speed maintained constant by the second controller upon a condition that the ambient temperature is equal to or more than a threshold value;
a fuel control valve configured to control a fuel supply from a fuel supply source to the combustor;
a fuel controller configured to control the fuel control valve; and
an inlet guide vane set angle controller including the first controller, the second controller, and the ambient temperature correction part, and configured to control the set angle of the inlet guide vane.

2. The two-shaft gas turbine according to claim 1, further comprising:
a gas generator control system configured to control an operating state of the two-shaft gas turbine and including:
the fuel controller configured to control the fuel control valve by using a rotational speed detected by a rotational speed detector mounted on the second shaft and operation load data obtained from a load; and
the inlet guide vane set angle controller.

3. The two-shaft gas turbine according to claim 2,
wherein the inlet guide vane set angle controller further includes:
an operating state determination part configured to determine whether an operating state of the gas generator is a first operating state including startup, shut-off and a low load operating state or a second operating state including a high load operating state other than the first operating state; and
a control selection part configured to select one of the first controller and the second controller to use based on a determination result by the operating state determination part.

4. The two-shaft gas turbine according to claim 3,
wherein when the gas generator is in the low load operating state as the first operating state, the first controller is selected to provide a control to uniquely set the corrected speed and the set angle of the inlet guide vane, and
wherein when the gas generator is in the high load operating state as the second operating state, the second controller is selected to provide a control to maintain the constant actual speed.

5. The two-shaft gas turbine according to claim 1,
wherein the first controller is configured to calculate the corrected speed by using a rotational speed of the gas generator obtained by a rotational speed detector mounted on the first shaft and the ambient temperature obtained by a thermometer, and to control the set angle of the inlet guide vane.

6. The two-shaft gas turbine according to claim 1, further comprising:
a third controller configured to provide a control to maintain constant set angle of the inlet guide vane irrespective of a rotational speed of the first shaft of the gas generator in transition from a control by the first controller to a control by the second controller.

7. The two-shaft gas turbine according to claim 1, further comprising:
an ambient temperature additional correction part configured to reduce the set angle of the inlet guide vane upon a condition that the ambient temperature is equal to or more than the threshold value.

8. The two-shaft gas turbine according to claim 7,
wherein the compressor is divided into three stage groups of a forward stage group on the most upstream side, a rear stage group on the most downstream side, and a middle stage group positioned at between the forward stage group and the rear stage group, each of three stage groups having substantially the same number of stages, the compressor in a rated load operation exhibiting a distribution of blade loadings where the forward stage group has the maximum value of the blade loadings.

9. A control system of a two-shaft gas turbine,
wherein the two-shaft gas turbine comprises:
a gas generator including a compressor configured to have an inlet guide vane on an air intake side and compress inlet air, a combustor configured to generate a combustion gas by combusting the inlet air compressed by the compressor and a fuel, and a high pressure turbine configured to be driven by the combustion gas generated by the combustor; and
a low pressure turbine configured to be driven by a gas discharged from the high pressure turbine,
wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and
wherein the control system comprises:
a first controller configured to control the set angle of the inlet guide vane based on a corrected speed of the first shaft of the gas generator during low speed rotation of the first shaft of the gas generator, the corrected speed having been corrected according to an ambient temperature;
a second controller configured to control the set angle of the inlet guide vane to maintain a constant actual speed of the first shaft of the gas generator during high speed rotation of the first shaft of the gas generator;
an ambient temperature correction part configured to increase the constant actual speed maintained constant by the second controller upon a condition that the ambient temperature is equal to or more than a threshold value;
a fuel control valve configured to control a fuel supply from a fuel supply source to the combustor;
a fuel controller configured to control the fuel control valve; and
an inlet guide vane set angle controller including the first controller, the second controller, and the ambient temperature correction part, and configured to control the set angle of the inlet guide vane.

10. The control system of the two-shaft gas turbine according to claim 9, further comprising:
a gas generator control system configured to control an operating state of the two-shaft gas turbine and including:
the fuel controller configured to control the fuel control valve by using a rotational speed detected by a rotational speed detector mounted on the second shaft and operation load data obtained from a load; and
the inlet guide vane set angle controller.

11. The control system of the two-shaft gas turbine according to claim 10,
wherein the inlet guide vane set angle controller further includes:
an operating state determination part configured to determine whether the operating state of the gas generator is a first operating state including startup, shut-off and a low load operating state or a second operating state including a high load operating state other than the first operating state; and
a control selection part configured to select one of the first controller and the second controller to use based on a determination result by the operating state determination part.

12. The control system of the two-shaft gas turbine according to claim 11,
wherein when the gas generator is in the low load operating state as the first operating state, the first controller is selected to provide a control to uniquely set the corrected speed and the set angle of the inlet guide vane, and
wherein when the gas generator is in the high load operating state as the second operating state, the second controller is selected to provide a control to maintain the constant actual speed.

13. The control system of the two-shaft gas turbine according to claim 9,
wherein the first controller is configured to calculate the corrected speed by using a rotational speed of the gas generator obtained by a rotational speed detector mounted on the first shaft and the ambient temperature obtained by a thermometer, and to control the set angle of the inlet guide vane.

14. A control method of a two-shaft gas turbine,
wherein the two-shaft gas turbine comprises:
a gas generator including a compressor configured to have an inlet guide vane on an air intake side and compress inlet air, a combustor configured to generate a combustion gas by combusting the inlet air compressed by the compressor and a fuel, and a high pressure turbine configured to be driven by the combustion gas generated by the combustor; and
a low pressure turbine configured to be driven by a gas discharged from the high pressure turbine,
wherein a first shaft which is a shaft of the gas generator and a second shaft which is a shaft of the low pressure turbine are separate shafts from each other, and a mass flow of the inlet air into the compressor is regulated by controlling a set angle of the inlet guide vane, and
wherein in the control method,
a first control is executed by a first controller during low speed rotation of the first shaft of the gas generator, the first control being to control the set angle of the inlet guide vane based on a corrected speed of the first shaft of the gas generator, the corrected speed having been corrected according to an ambient temperature;
a second control is executed by a second controller during high speed rotation of the first shaft of the gas generator, the second control being to control the set angle of the inlet guide vane to maintain a constant actual speed of the first shaft of the gas generator;
the constant actual speed maintained constant by the second controller is increased by an ambient temperature correction part upon a condition that the ambient temperature is equal to or more than a threshold value;
a fuel control valve is configured to control a fuel supply from a fuel supply source to the combustor;
a fuel controller is configured to control the fuel control valve; and
an inlet guide vane set angle controller includes the first controller, the second controller, and the ambient temperature correction part, and is configured to control the set angle of the inlet guide vane.

15. The control method of the two-shaft gas turbine according to claim 14,
wherein the two-shaft gas turbine further comprises:
a gas generator control system configured to control an operating state of the two-shaft gas turbine and including:
the fuel controller configured to control the fuel control valve by using a rotational speed detected by a rotational speed detector mounted on the second shaft and operation load data obtained from a load; and the inlet guide vane set angle controller, wherein the inlet guide vane set angle controller further includes:

an operating state determination part configured to determine whether the operating state of the gas generator is a first operating state including startup, shut-off and a low load operating state or a second operating state including a high load operating state other than the first operating state; and a control selection part configured to select one of the first controller and the second controller to use based on a determination result by the operating state determination part, wherein in the control method, when the gas generator is in the low load operating state as the first operating state, the first controller is selected to provide a control to uniquely set the corrected speed and the set angle of the inlet guide vane, and wherein in the control method, when the gas generator is in the high load operating state as the second operating state, the second controller is selected to provide a control to maintain the constant actual speed.

16. The control method of the two-shaft gas turbine according to claim 14, wherein the set angle of the inlet guide vane is controlled by the first controller which calculates the corrected speed by using a rotational speed of the gas generator obtained by a rotational speed detector mounted on the first shaft and the ambient temperature obtained by a thermometer.

* * * * *